United States Patent [19]

Frost

[11] Patent Number: 4,759,223
[45] Date of Patent: Jul. 26, 1988

[54] FLUID MASS FLOW METER

[76] Inventor: Saul Frost, 38 Barr Rd., Berwyn, Pa. 19312

[21] Appl. No.: 918,760

[22] Filed: Oct. 14, 1986

[51] Int. Cl.$^4$ .............................................. G01F 1/84
[52] U.S. Cl. .................................................. 73/861.38
[58] Field of Search ......................... 73/861.37, 861.38

[56] References Cited

U.S. PATENT DOCUMENTS

| | | |
|---|---|---|
| 2,106,194 | 1/1938 | Stover . |
| 2,624,198 | 1/1953 | Pearson . |
| 3,396,579 | 8/1986 | Souriau ............................. 73/861.38 |
| 4,127,028 | 11/1978 | Cox et al. ......................... 73/861.38 |
| 4,187,721 | 2/1980 | Smith . |
| 4,422,337 | 12/1983 | Hafner ............................. 73/861.17 |
| 4,491,025 | 1/1985 | Smith et al. ...................... 73/861.38 |

Primary Examiner—Herbert Goldstein
Attorney, Agent, or Firm—Seidel, Gonda, Goldhammer & Abbott

[57] ABSTRACT

A mass flow meter has a high inertial support. A fluid conduit is fixedly mounted on the support. The conduit has a symmetrical portion and a flexible connecting portion. The connecting portion is interposed between the support and the symmetrical portion. The symmetrical portion has a geometric center and an axis through the geometric center. A housing is rigidly affixed to the symmetrical portion. A rotor is rigidly mounted for rotation within said housing. The rotor is located at the geometric center and is perpendicular to the axis. The rotor is maintained at the geometric center and perpendicular to the axis at all times during the operation of said meter. A device is varying rotational speed of the rotor is operatively connected to the rotor. A mechanism for oscillatory driving the housing and its contents about said axis is operatively connected to the symmetrical portion. A mechanism for sensing movement of the symmetrical portion is operatively connected to said symmetrical portion. A mechanism for determining the rotational speed of the rotor is operatively associated with the rotor.

12 Claims, 5 Drawing Sheets

INFORMATION FLOW FOR IN-PHASE OSCILLATION OF COILS

FLUID MASS FLOW METER

FIELD OF THE INVENTION

This invention is related to a fluid mass flow meter. Specifically, fluid mass flow is determined by the measurement of gyroscopic forces generated by a rotor which is coaxial and coplanar with a circular conduit.

BACKGROUND OF THE INVENTION

Mass flow meters operate on the principles of mechanics. Specifically, coriolis and/or gyroscopic forces are measured. These forces are proportional to the fluid mass flow.

Fluid mass flow meters based on a measurement of coriolis forces are disclosed in U.S. Pat. Nos. 4,187,721; 4,422,337 and 4,491,025. In those meters, the fluid moves through a "U"-shaped conduit.

A mass flow meter based on a measurement of gyroscopic forces is disclosed in U.S. Pat. No. 2,624,198. Fluid is passed through a conduit which is in the form of a coil. The ends of the coiled conduit are diametrically opposed and define an axis ("rotational axis") which is normal to an axis ("coil axis") of the coiled conduit. The coiled conduit is rotated or oscillated about the rotational axis. One end of the conduit is connected to a sensor. A flywheel is coaxial with the coiled conduit but is not coplanar. When fluid flows through the conduit, the conduit is rotated or oscillated about the rotational axis and the flywheel is not rotating; a couple is generated about a third axis. The third axis is perpendicular to the coil axis and rotational axis. This couple causes a deflection at the end of the coil connected to the sensor. The flywheel is rotated so to nullify the deflection. The flywheel's rotational speed is proportional to the fluid mass flow in the conduit.

SUMMARY OF THE INVENTION

A mass flow meter has a high inertial support. A fluid conduit is fixedly mounted on the support. The conduit has a symmetrical portion and a flexible connecting portion. The connecting portion is interposed between the support and the symmetrical portion. The symmetrical portion has a geometric center and an axis through the geometric center. A housing is rigidly affixed to the symmetrical portion. A rotor is rigidly mounted for rotation within said housing. The rotor is located at the geometric center and is perpendicular to the axis whereby the rotor is always maintained in dimensional stability with the symmetrical portion. A device for varying rotational speed of the rotor is operatively connected to the rotor. A mechanism for periodically driving the symmetrical portion about an axis is operatively connected to the symmetrical portion. A mechanism for sensing movement of the symmetrical portion is operatively connected to said symmetrical portion. A mechanism for detecting the rotational speed of the rotor is operatively associated with the rotor.

DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE DRAWINGS

Figure 1:
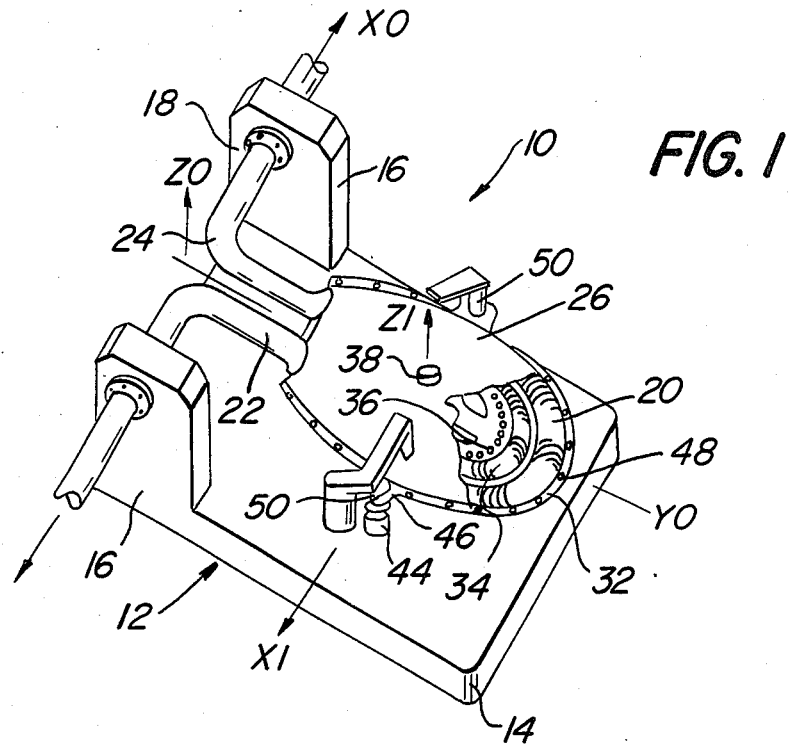
FIG. 1 is an isometric view of a preferred embodiment of the present invention, parts broken away for clarity.

Referring to the drawings wherein like numerals indicated like elements there is shown in FIG. 1 a first embodiment of the present invention designated 10.

A high inertial support 12 comprises a base 14 and two upstanding arms 16. The arms 16 are laterally disposed on the edge portions of the base 14. The arms 16 are perpendicular to the base 14. The arms 16 are parallel to one another. The support 12 is exemplary of the supports contemplated by this invention, but is by no means limiting.

A fluid conduit 18 is supported by the arm 16 of the support 12. The conduit 18 is connected to an external source of fluid. Conduit 18 is preferably tubular. Conduit 18 preferably includes a circular portion 20, a flexible connector portion 22 and an interconnecting or mounting portion 24. The three portions 20, 22, 24 are planar. The three portions 20, 22, 24 are preferably integral. The conduit 18 is made of a highly resilient material such as steel, tempered aluminum, hardened copper or beryllium.

The mounting portion 24 includes two members. Each mounting portion 24 is fixed perpendicularly to an arm 16. Each mounting portion 24 extends inwardly toward the other.

The flexible connecting portion 22 preferably includes two rigid members. Each connecting portion 22 is perpendicular to its mating mounting portion 24. Each connecting portion 22 defines a cantilever beam. All flexing action of conduit 18 occurs in flexible connecting portion 22. The rigid flexible connecting portion 22 can be replaced by a plastic tube or bellows as will be explained below.

The circular portion 20 is a single member. The circular portion 20 joins the ends of the connecting portion 22 and completes the circuit through which fluid passes. Circular portion 20 could comprise a spiral member having a plurality of rings. The essential feature of the circular portion 20 is its symmetry about its geometric center. Accordingly any geometric shape which is symmetric about its geometric center could be used.

A housing 26 is fixedly attached to the circular portion 20. The housing 26 is preferably formed in a top section 28 and a bottom section 30. The top and bottom sections of the housing are generally circular and are adapted to fit snugly on the circular portion 20. Each section 28, 30 has an outwardly extending flange 32. The housing 26 is secured about the circular conduit 20 by the flange 32. The flange 32 of the top and bottom portion 28, 30 are joined in any conventional manner. Housing 26 is provided to form a frame work within which elements discussed below can be held coaxial and coplanar with the circular portion 20 discussed above. Accordingly, the housing 26 is not limited to the specific structure shown.

A dynamically and statically balanced rotor 34 is coaxial and coplanar with the circular portion 20. The rotor 34 is located at the geometric center of the circular portion 20. The fluid flow is preferably coplanar with the plane of the rotor 34 and in alternate geometries the fluid flow is substantially parallel to and coplanar with the rotor plane. Rotor 34 is located within housing 26.

The rotor 34 is rigidly mounted in relation to the circular portion 20 so that the rotor is always coaxial and coplanar with the circular portion. The housing 26 maintains the rotor in absolute dimensional stability with the circular portion during operation of the meter.

Rotor 34 includes a plurality of holes 36. The holes 36 are equidistantly placed from the rotor axis (Z1). The significance of the holes 36 will be discussed below.

The rotor 34 is mounted within the housing 26 on a shaft 38. The shaft 38 is connected to a variable speed drive means 40. Such variable speed drive means 40 are well known in the art. The ends of the shaft are journaled in any conventional manner. The drive means 40, in one embodiment (FIG. 2), is mounted on the base 14 of the support 12. In that embodiment, the drive means 40 is flexibly coupled 42 to the shaft 38, in any conventional manner. The drive means 40, in an alternate embodiment (FIG. 3), is mounted within the housing 26. In the alternate embodiment, no flexible coupling is required.

Drive coils 44 are fixed on the base 14 of support 12. Two drive coils 44 are diametrically opposed to one another on the periphery of the housing 26. These two drive coils 44 define a line which is parallel to the mounting portion 24. The drive coils 44 are connected to the flange 32 of the housing 26. Preferably, the flange 32 include integral tabs 46 which are connected to the drive coils 44.

Preferably, the drive coils 44 are magnetic drive coils. The coils 44 can be operated in phase or out of phase, together or independently. When the drive coils 44 are energized, they can displace the housing 26 and the components contained therein about an axis (XO) (See FIG. 1) defined by the mounting portion 24. In an alternative embodiment of the device, a third drive coil 44 is located equidistant from the two coils described above and at the bight 48 of the circular portion 20. The drive coils 44 are actuated by an electric signal "D", discussed below.

Directly above each drive coil 44 is a sensing coil 50. Each sensing coil 50 is coupled to the flange 32 of the housing 26, or preferably to a tab 46. The sensing coils 50 are any coil capable of sensing the movement and generating an electric signal "S" proportional to the movement of the housing 26 and the components contained therein.

A light source 52 is positioned on one side of the housing 26. A light sensor 54 is located in line with the light source 52 on the opposite side of the housing 26. The housing 26 is provided with windows 56 which are in line with the light source 52 and light sensor 54. The windows 56 allow light to pass through the housing 26. The housing 26 is provided with windows 56 which are in line with the light source 52 and light sensor 54. The windows 56 allow light to pass through the housing 26. The source 52 and sensor 54 are in line with the plurality of holes 36 in the rotor 34. The light sensor 54 is any conventional light sensor which can generate an electric signal. The source 52, sensor 54 and holes 36 are system to detect rotor speed. Alternate methods, known by those familiar with the art, can be used for measuring the rotors speed.

The drive coils 44, sensing coils 50, drive means 40 and light sensor 54 are operably connected to a computer means (not shown). Of course it will be well understood by those skilled in the art that the computer means could be a microprocessor or any other device capable of manipulating data. A control algorithm will be explained below.

Figure 10:
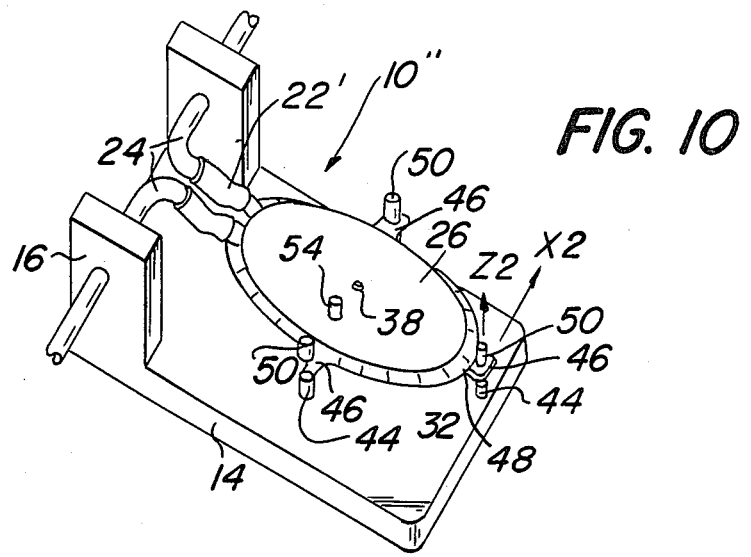
FIG. 10 is an isometric view of an alternate embodiment.
Figure 11:
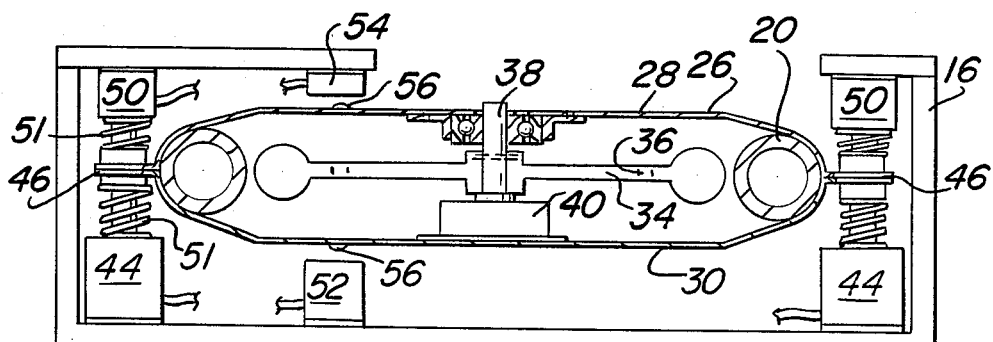
FIG. 11 is a section view of an embodiment associated with the embodiment shown in FIG. 10.
Figure 12:
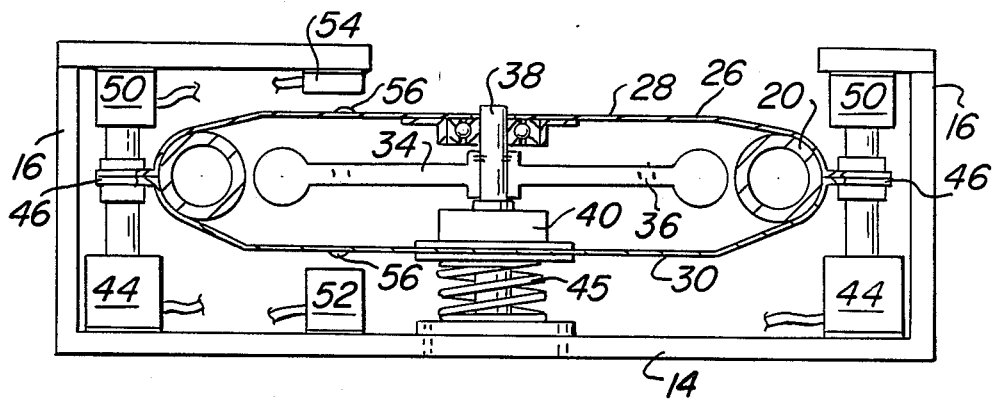
FIG. 12 is a section view of an alternate embodiment associated with the embodiment shown in FIG. 10.

A third embodiment 10" of the invention is disclosed in FIGS. 10–12. In this embodiment, the rigid connector members 22 of the conduit 18 are replaced with a flexible connector 22'. The flexible connector 22' can be a plastic tube or bellows.

The housing 26 and the components associated herewith are supported by springs 51 which surround the extensions of drive 44 and sensing coils 55. Alternatively, the housing 26 can be supported by a single spring 45 which is coaxial with the housing 26.

In operation, the lateral drive coils 44 are driven 180° out of phase to produce a resonate oscillatory rotation around the Y1 axis. The bight 48 sensing coil senses precessional displacement on the Y axis. When the net spin vector is zero, no precessional displacement is noted at the bight sensing coil.

To simplify the explanation of the conduit, rotor and housing movement, the following coordinate systems are defined. The first coordinate system uses the high inertial support 12 as the reference frame. The axis defined by the mounting members 24 of the conduit is called XO. The axis normal to XO and parallel to the base 14 of the support 12 is YO. The axis normal to the plane defined by the XO and YO is ZO.

The second coordinate system uses the axis of the circular portion 20 of the conduit 18 and rotor 34 as its origin. X1 is parallel to XO. Y1 is YO but for the new displaced origin. Z1 is parallel to ZO but displaced therefrom.

The final coordinate system uses the bight 48 of the circular portion 20, the bight is remote from the mounting portion 24, as an origin. X2 is parallel to and displaced from XO and X1. X2 is YO or Y1 but for the new origin and Z2 is parallel to and displaced from ZO and Z1, FIG. 10.

In a first operational mode, the entire meter 10 is at rest, i.e. no fluid movement nor rotor rotation. The drive coils 44 simultaneously displace the housing 26 downwardly (Z1). This downward displacement causes a deflection of the connecting portion 22 about the mounting portion 24 (XO). The downward displacement causes the connecting portion 22 and the housing 26 to resonate about the mounting portion 24 (XO).

There is not precessional displacement about axis Y1. In the preferred embodiment the meter is driven in the resonate mode.

When fluid moves through the conduit, it generates an angular momentum proportional to its mass flow rate. The angular momentum will cause a precessional displacement of the housing about axis Y1.

The rotor 34 is rotated to nullify the precessional displacement caused by the fluid's angular momentum. This nullification is the result of reducing a "net spin vector" to zero. In other words, a spin vector due to the angular momentum of the fluid is produced along the Z1 axis. The rotor 34 is spun to create a spin vector equal and opposite to the spin vector corresponding to the fluid. The rotor speed is controlled based on the amount of precessional displacement sensed by sensor coils 50. Rotor speed is monitored by the use of light source 52, light sensor 54 and holes 36.

In a second operational mode, the entire meter is at rest, i.e. no fluid movement nor rotor rotation. The drive coils 44 are driven 180° out-of-phase. The drive coils 44 induce an oscillatory vibration about the Y1 axis. No precessional rotation is generated about the X0 axis.

When fluid flows through the conduit, it generates an angular momentum proportional to its mass flow. The angular momentum will cause a precessional displacement about the axis X0.

The rotor 34 is rotated to nullify the precessional displacement caused by the fluid's angular momentum.

Figure 4:
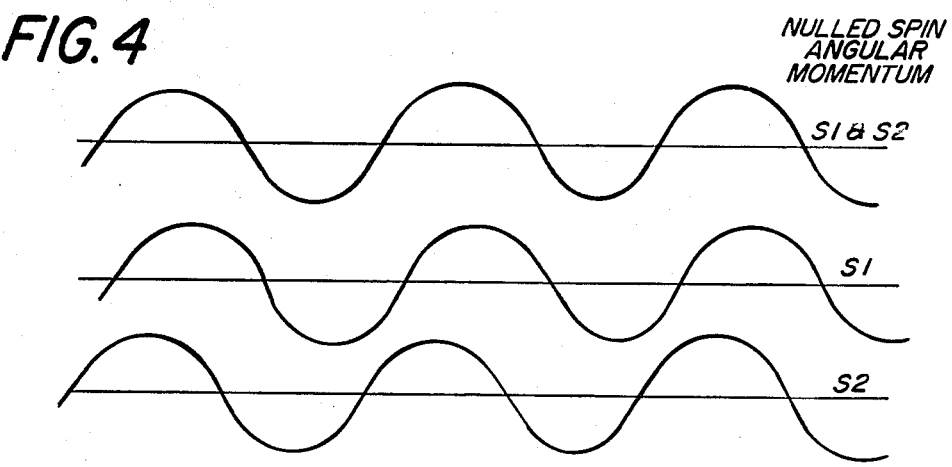
FIG. 4 is an illustration of electrical signals produced by sensor coils of the present invention, the upper most curve representing a nullified spin rector.

When the spin vector corresponding to the angular momentum of the fluid is equal but opposite to the spin vector associated with the rotating rotor, it is equivalent to no fluid flow and no rotor rotation. When the net spin vector is oriented in the negative direction (downward or toward base 14) along the Z1 axis, it is due to either an increasing fluid mass flow or a decrease revolution rate of the rotor. The negative spin vector creates a positive phase shift between signals $S_2$ and $S_1$. See FIG. 6. Signals $S_2$ and $S_1$ are generated from the lateral sensing coils 50. When the net spin vector is oriented in the positive Z1 direction (upward or away from base 14), the phase shift is reversed and $S_1$ leads $S_2$. See FIGS. 4 and 5.

FIGS. 4–9 illustrate methods of extracting the electrical signal data from the mass flow meter. The electrical signals from the various sensors provide information required to calculate the mass flow rates and density of the fluid. From the flow rate and density values other flow parameters are readily obtained by methods and theorems well known in the art. Two modes of data handling are considered. In the first mode, illustrated in FIG. 7, the sensor coils 50 operates at the same frequency but with either no phase separation or with a small phase separation as determined by the magnitude and polarity of the net spin vector. This configuration is appropriate for the cantilever elastic support configuration (e.g. FIG. 1). The output of sense coils S1 and S2 are each processed by circuits designated SIG COND and OSC, which are described further below. From the SIG COND circuit, the data is supplied directly to the MASTER MODULE and indirectly through flip-flop S1FF.

The OSC circuits are oscillators, the outputs of which drive coils D1 and D2. A third signal, ROTOR DATA, derived from the rotor motor, is likewise input to the MASTER MODULE. INPUT DATA, data inserted into the MASTER MODULE, is data other than that received from the sensor. INPUT DATA are of two types: (1) manual input data required by the MASTER MODULE to carry out its programmed algorithms; and (2) data that may be supplied by other processes from parts of a process loop. From the MASTER MODULE an output signal—ROTOR MOTOR CONTROL—is transmitted to control the rotor's motor. Additional outputs are to the OUTPUT DISPLAYS and as OUTPUTS FOR PERIPHERIAL SYSTEMS.

The sense signal S1 is an anolog periodic signal that is processed by the electronic circuitry within OSC. The electronic analog current from OSC drives the drive coil D1. The magnetic field from coil D1 exerts a force upon the extension tab 46 attached to the sensor coil 50. This force interacts with the elastic constant of the cantilever connecting portion 22 to produce a resonant vibratory motion of the housing 26 and the elements contained therein. The frequency of this vibratory motion is equal to the product of $2\pi$ times the square root of the elastic constant divided by the moment of inertia of housings and the elements contained therein. Sensor signal S2 is treated in a like manner. Signals S1 and S2 are produced as a result of the magnetic feedback from the extension tabs 46.

S1 and S2 are also converted by the SIG COND circuits to a digital format by clipping the periodic signals. This conversion of S1 and S2 to a digital format permits the usage of well established computer techniques for all computations. The resulting signals S1Q and S2Q from the S1G COND circuits are compared within the MASTER MODULE. When S1O and S2O are in phase the net spin vector is nulled, see FIG. 5. If there is a phase shift the magnitude of this shift is indicated as the width of the pulses EX0. For a phase reversal, the phase of EX0 will be changed with respect to S1Q, see FIGS. 5 and 6. Within the MASTER MODULE a digital clock is used to measure the time duration of EX0. Combining this time duration with the relationship of S1Q the MODULE generates an output control signal, ROTOR MOTOR CONTROL. The ROTOR MOTOR CONTROL signal determines the rotor's revolution rate and direction in order to minimize the width of EX0. The revolving rotor transmits the ROTOR DATA feedback signal to the MASTER MODULE. The MASTER MODULE, using its internal algorithm, computes the mass flow rate.

If S1Q is applied to a divide-by-two circuit such as a flip-flop S1FF, its ON and OFF time duration are doubled. The measurement of either of these time durations, performed within the MASTER MODULE, is a direct measurement of the period of the resonant frequency of the sensor's system. Using this data the internal algorithm the fluid's density is determined.

For making changes to the internal algorithm, data is inserted either manually or from a remote source such as used for control loops.

Figure 8:
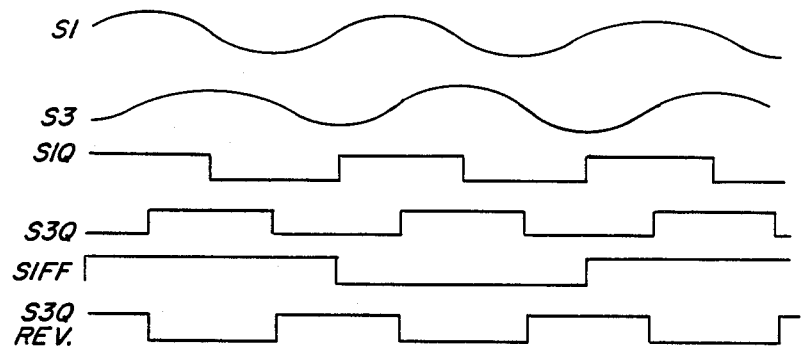
FIG. 8 is an illustration of signals similar to those shown in FIGS. 4–6.
Figure 9:
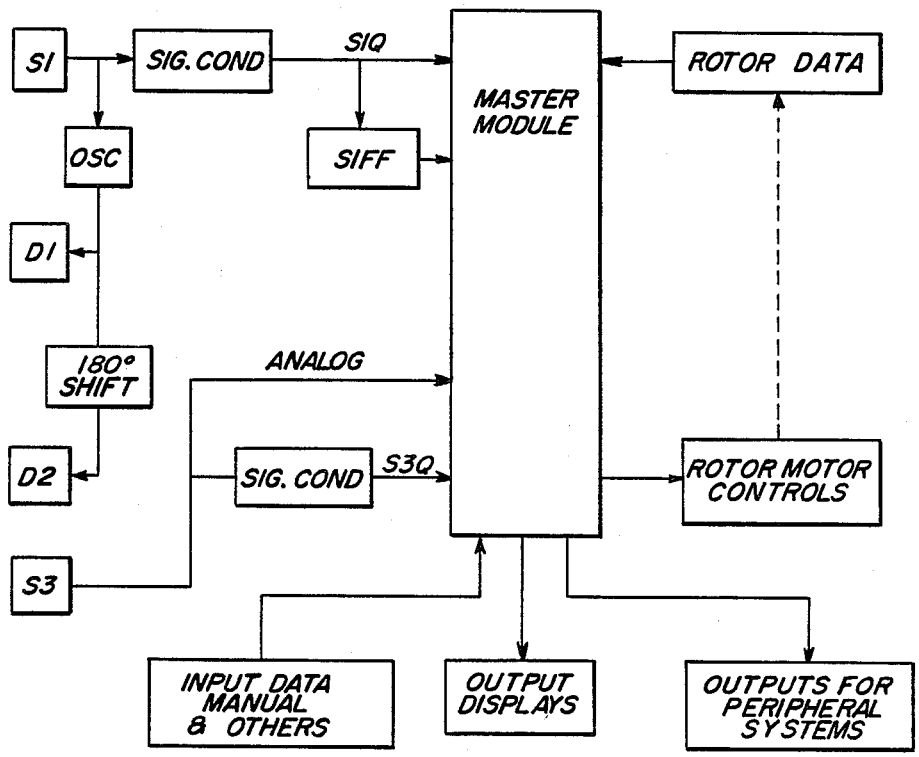
FIG. 9 is a schematic of an electronic data flow chart.

FIGS. 8 and 9 illustrates a second mode for handling the sensor's data. The circuit outlined in FIG. 9 operates in the same manner as that in FIG. 7, but with the following differences. In the second mode sensor S2 is treated as in the previous method, but with the addition that the OSC output is further shifted 180° to drive coil D2. Signal S3, unlike that of S2, is an analog signal with an amplitude directly related to the magnitude of the spin vector and with a fixed phase shift of 90°. The polarity of this shift is dependent on the directionality of the spin vector—positive or negative. See FIG. 8. Within the MASTER MODULE the analog signal S3 is used as an input of the control loop for generating the ROTOR MOTOR CONTROL signal to the rotor's motor controls. The rotor's revolution rate will change in response to the ROTOR MOTOR CONTROL signal in order to nullify signal S3. In addition, signals S1Q and S3Q are compared within the MASTER MODULE and contribute additional control data for the rotor's motor control. The sensor's oscillatory period and the mass flow rate, as well as the internal algorithms, are similar to those for the previously described mode.

The internal algorithms of the MASTER MODULE include the calculation formulation within the analytical action of this invention.

It will be evident to those familiar with the techniques of data handling, controls and computer technology that the previous data handling techniques represent only a few of the large number of different methods that can be employed. Moreover, those skilled in the art will readily understand the operation and structure of the various circuit elements discussed above, and, accordingly, they need not be disclosed in greater detail here.

Figure 2:
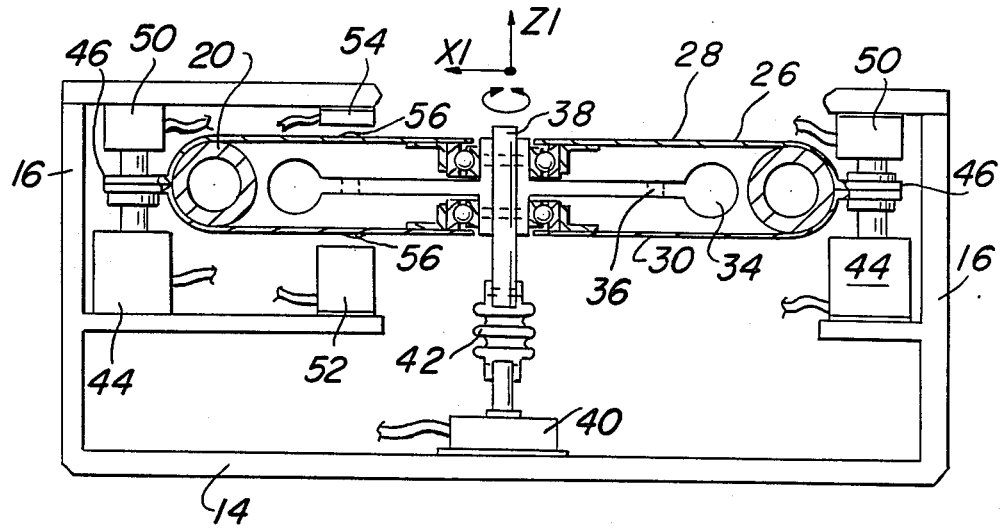
FIG. 2 is a sectional view of an embodiment of the present invention.
Figure 3:
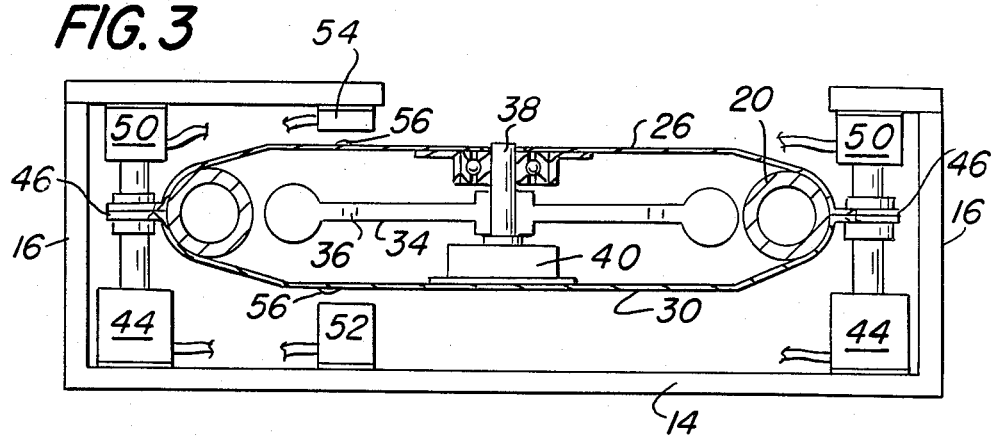
FIG. 3 is a sectional view of an alternate embodiment of the present invention.

To supplement the physical description of the present invention the following mathematical derivations are provided. These mathematical derivations are the basis for the internal algorithms discussed above. Conversion of these derivations to suitable algorithms is well known in the art. Accordingly, specific and detailed recitation need not be made about the internal algorithms. Utilizing the principal or gyroscopic reactions the controlling equations for the conduit-rotor gyroscopic motion, assuming small angular displacement, are:

$$(A_o + A_f)\left(\frac{d^2\bar{\theta}}{dt^2}\right) + K\bar{\theta} - (C_fW_f - C_RW_R)\left(\frac{d\bar{\Phi}}{dt}\right) = 0$$

$$(A_o + A_f)\left(\frac{d^2\bar{\Phi}}{dt^2}\right) + k\bar{\Phi} + (C_fW_f - C_RW_R)\left(\frac{d\bar{\theta}}{dt}\right) = M$$

subscripts;
- o = entire device minus fluids within the conduit
- f = fluid within the conduit 13 of FIG. 2
- R = rotor 14 of FIG. 2
- $\bar{\Phi}$ = resonate oscillation angular displacement about axis in the plane of the conduit
- $\bar{\theta}$ = precessional angular displacement about an axis orthogonal to the axis of O rotation
- W = revolution rate, radian per second
- A = moment of inertia perpendicular to the spin axis
- C = moment of inertia along the spin axis
- K = elastic spring constant for restoring $\bar{\theta}$'s deflection
- k = elastic spring constant for restoring $\bar{\Phi}$'s deflection
- M = moment vector generated by the external vibrating system.

Inserting the gyroscopic precessional rotation $\bar{\theta} = -m\bar{\Phi}$, where m is the coupling coefficient, into the previous expression yields, $$(A_o + A_f)\left(\frac{d^2\bar{\theta}}{dt^2}\right) + \left(\frac{1}{m}\right)(C_fW_f - C_RW_R)\left(\frac{d\bar{\theta}}{dt}\right) + K\bar{\theta} = 0$$

-continued $$(A_o + A_f)\left(\frac{d^2\bar{\Phi}}{dt^2}\right) - m(C_fW_f - C_RW_R)\left(\frac{d\bar{\Phi}}{dt}\right) + k\bar{\Phi} = \bar{M}$$

The term $(C_fW_f - C_RW_R)$ contained in both of the expressions contributes to the damping coefficient and to the value of the resonate frequency for angles $\theta$ and $\phi$. For both components the resonate frequencies are give by, $$f_\theta = \frac{1}{2\pi}\left[\frac{K}{A_o + A_f} - \frac{1}{4}\left(\frac{C_fW_f - C_RW_R}{m(A_o + A_f)}\right)^2\right]^{\frac{1}{2}}$$

$$f_\Phi = \frac{1}{2\pi}\left[\frac{k}{A_o + A_f} - \frac{1}{4}\left(\frac{m(C_fW_f - C_RW_R)}{A_o + A_o}\right)^2\right]^{\frac{1}{2}}$$

For density determinations the resonate frequency must be independent of the flow conditions and this can only occur when $C_fW_f = C_RW_R$, which is the same condition for determining the fluids mass flow rate, reducing the above to $$f_\theta = \frac{1}{2\pi}\left[\frac{K}{A_o + A_f}\right]^{\frac{1}{2}}$$

$$f_\Phi = \frac{1}{2\pi}\left[\frac{k}{A_o + A_f}\right]^{\frac{1}{2}}.$$

The resonate frequencies must be sufficiently separated so as to minimize the possibilities of the oscillating system from jumping in-and-out of different modes of oscillations and in addition the resonate oscillation driving frequency is to be the lowest resonate frequency of the device. All internal and external components of the mass flow meter, as well as those of the mounting hardware, are to have resonate frequencies greater than that of the resonate ocillation and sufficiently decoupled to prevent multiharmonic osillations.

DENSITY DETERMINATION

To further enhance, and to simplify, the understanding of gyroscopic fluid mass flow meter the expression for the resonate oscillation frequency, either or depending on the oscillating mode, is to be expressed in terms of the time period per cycle:

$$T = 2\pi\left[\frac{A_o + A_f}{k}\right]^{\frac{1}{2}} = \left[\frac{N_{ff}}{N_{clkl}}\right],$$

Figure 5:
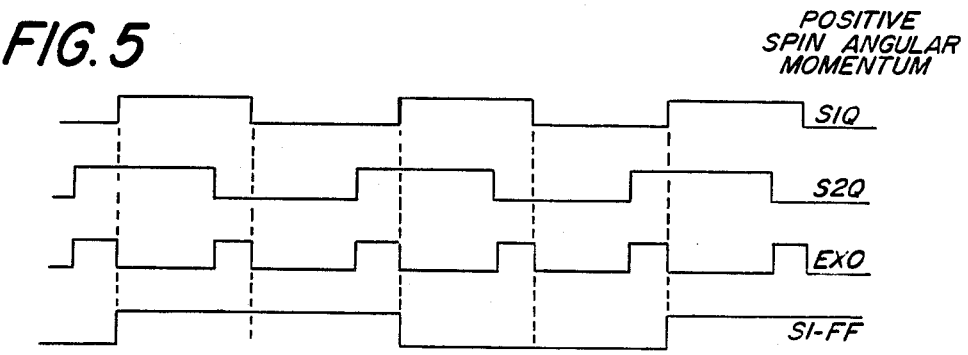
FIG. 5 is an illustration of squared or clipped signals similar to those shown in FIG. 4 and representing a positive spin vector.
Figure 6:
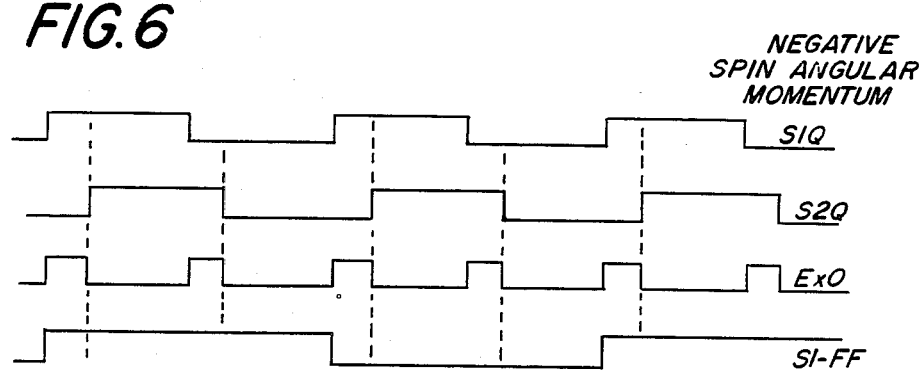
FIG. 6 is an illustration of squared or clipped signals similar to those shown in FIG. 4 and representing a negative spin vector.
Figure 7:
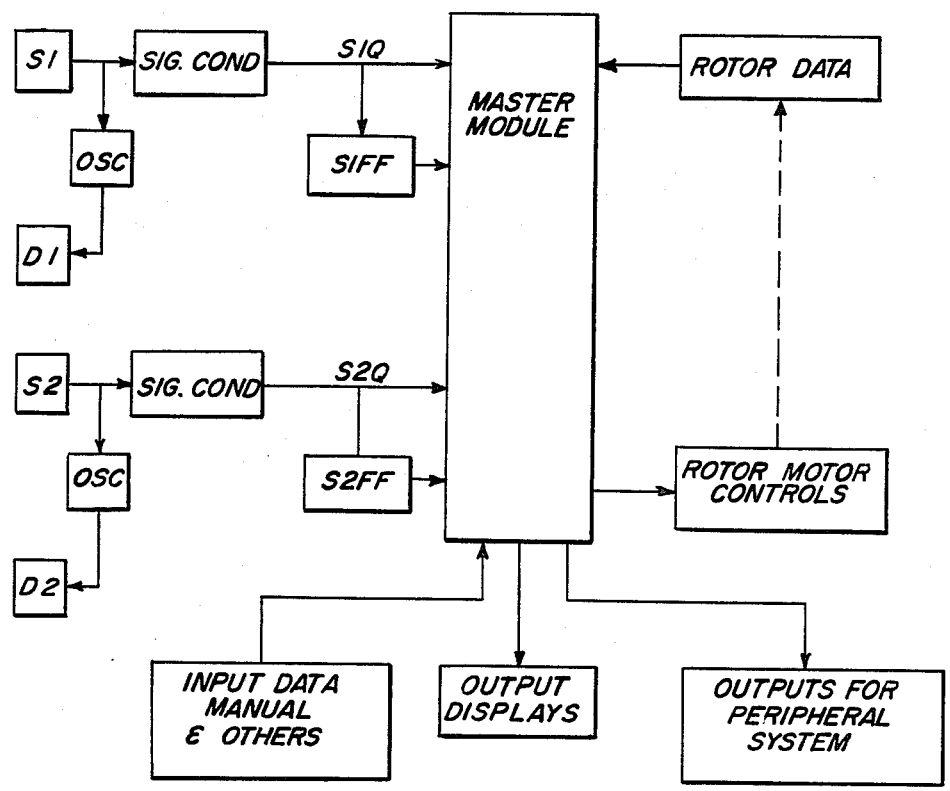
FIG. 7 is a schematic of an electronic data flow chart.

$N_{ff}$ = number of pulses counted during the FF period of FIGS. 5, 6 and 8
$N_{clkl}$ = number of pulses per second of the reference clock clk1

Three measurements are required to obtain the fluid's density; two calibration time periods one with no fluid in the conduit and the second with the conduit filled a calibrating fluid and the final measurement for the unknown flowing fluid in the conduit from which the following three expressions are obtained, $$T_o = 2\pi \left[\frac{A_o}{k}\right]^{\frac{1}{2}} \text{ (Empty conduit)}$$

$$T_w = 2\pi \left[\frac{A_o + A_w}{k}\right]^{\frac{1}{2}} \text{ (Calibrating fluid)}$$

$$T_f = 2\pi \left[\frac{A_o + A_f}{k}\right]^{\frac{1}{2}} \text{ (Unknown fluid)}$$

Combining these three expressions yields the following, $$\frac{A_f}{A_w} = \frac{T_f^2 - T_o^2}{T_w^2 - T_o^2} = \frac{(N_{ff-F})^2 - (N_{ff-o})^2}{(N_{ff-W})^2 - (N_{ff-o})^2}$$

$$= \frac{K_c^2 M_f}{K_c^2 M_w} = (S.G.)_f = \frac{D_f}{D_w}, \text{ and}$$

$$D_f = D_w \left[\frac{(N_{ff-f})^2 - (N_{ff-o})^2}{(N_{ff-w})^2 - (N_{ff-o})^2}\right]$$

where;
D = density of the fluid
M = mass of the fluid within the conduit
$K_c$ = centroid of inertia of the fluid carrying section of the conduit
S.G. = specific gravity of the fluid Thus the density determination is independent of the geometry of the device and of the elastic constants, accordingly only the number of pulses counted, during one-half of the FF cycle, are required.

FLUID MASS FLOW RATE DETERMINATION

In the expression $C_f W_f = C_R W_R$ the C values, moment of inertia, are equal to the product of the centroid of inertia squared times the mass of the material, i.e., $$C_f = K_f^2 M_f, \ C_R = K_R^2 M_R$$

where $K_f$ and $K_R$ are dependent only upon the physical dimension using $\overline{W}$ as the weight of the material, $$K_f^2 M_f \overline{W}_f = K_R^2 M_R \overline{W}_R, \text{ or}$$

$$\overline{W}_f \overline{w}_f = \left[\left(\frac{K_R}{K_f}\right)^2 \overline{W}_R\right] \overline{W}_R = \left[2\pi \overline{W}_R \left(\frac{K_R}{K_f}\right)^2\right] f_R$$

$$= U_o f_r$$

$$= Q$$

where,
$U_o$ = meter's constant, $$2\pi \overline{W}_R \left(\frac{K_R}{K_f}\right)^2$$

Q = weight of fluid flow per unit of time, $$= U_o \left(\frac{N_{TC}/CLK3}{H_R}\right) = U_o \left(\frac{N_{TC}}{CLK\ 3}\right)$$

where, $H_R$ = number of equally spaced holes, 38, drilled on the same radii of the rotor's rim,
$N_{TC}$ = number of light pulses counted in the time interval of one reference time CLK 3 period
$U_o$ = scaling factor having the units of weight per pulse In order to obtain the total mass flow during a time period, $t_2 - t_1$, the following summation is carried out;

$$\overline{Q} = \sum_{t_1}^{t_2} Q \overline{\Delta t} = U_o \sum_{t_1}^{t_2} N_{TC}$$

Similarly, expressions for the volumetric flow rate, $Q_v$, and for the total volumetric flow, $\overline{Q_V}$, are given by, $$Q_v = \left(\frac{Q}{D_f}\right) = \left(\frac{U_o}{D_f}\right)\left(\frac{N_{TC}}{CLK\ 3}\right)$$

$$\overline{Q_v} = \sum_{t_1}^{t_2} Q_v \cdot \Delta t = U_o \sum_{t_1}^{t_2} \frac{N_{TC}}{D_{f-ave}}$$

where $D_{f-ave}$ is the average fluid's density during the CLK3 period.

Although those familiar and skilled in the mechanical and electrical arts, data handling, computational manipulations and hardware may anticipate various changes and modifications of the embodiments of this invention that these changes may be made without departing from the scope of this invention as defined by the following claims.

I claim:
1. A mass fluid flow meter comprising:
    means for providing an inertial support;
    a fluid carrying conduit connected to said inertial support means and comprising a rigid tubular portion defining a plane and having two axes of symmetry, on said axis being a geometric center axis perpendicular to the plane and the second said axis lies in said plane;
    a rotor mounted for rotation about said geometric axis and lying in the plane of said tubular portion;
    means for housing said tubular portion and rigidly mounting said rotor to said tubular portion;
    means for producing resonant vibration of said tubular portion about said axis second;
    means for indicating density of fluid within the said conduit from the resonant oscillatory frequency;
    means for sensing the precessional induced oscillations;
    means for varying the rotational speed of said rotor;
    means for detecting the rotational speed of said rotor; and
    means operatively associated with said sensing means and said speed-varying means for modulating the speed of said rotor to null the precessional oscillatory movement sensed by said sensing means to provide an indication of the mass fluid flow rate traversing said conduit.
2. The mass flow meter according to claim 1 wherein said tubular portion is a circular portion.
3. The mass flow meter according to claim 2 wherein said rotor is coaxial and coplanar with said circular portion.
4. The mass flow meter according to claim 1 wherein said means for varying rotational speed is a variable speed motor.

5. The mass flow meter according to claim 1 wherein said means for producing resonant vibration is a pair of magnetic coils.

6. The mass flow meter according to claim 1 wherein said means for detecting the rotational speed of said rotor comprises said rotor having a plurality of holes, each said hole being disposed an equal distance from said geometric center axis, a light source disposed above said plurality of holes and a light sensor disposed below said plurality of holes, said source and said sensor being in line.

7. The mass flow meter according to claim 1 wherein said intertial support means and said conduct are connected by a rigid flexible portion.

8. The mass flow meter according to claim 1 wherein said inertial support means and said conduit are connected by a spring means.

9. A mass fluid flow meter comprising:
a conduit adapted to be connected to an external source of fluid and having a rigid circular portion which lies in a plane and an axis lying in said plane and a flexible connecting portion, said flexible connecting portion being interposed between said circular portion and the external flow source;
a rotor rigidly mounted to and concentric and coplanar with said circular portion;
means for producing resonant vibration of said circular portion about said axis;
means for sensing precessional movement of said circular portion and operatively connected to said circular portion;
means for varying the rotational speed of said rotor and operatively connected to said rotor;
means for detecting the rotational speed of said rotor and means operatively associated with said sensing means and said speed-varying means for modulating the speed of said rotor to null the precessional oscillatory movement sensed by said sensing means to provide a proportional representation of the mass fluid flow rate of fluid traversing said conduit; and
means for measuring the resonant vibration frequency from which the density of the fluid within the conduit is calculated and displayed.

10. The mass flow meter according to claim 9 wherein said flexible connecting portion is a rigid flexible member.

11. The mass flow meter according to claim 9 wherein said flexible connecting portion is spring means.

12. The mass flow meter according to claim 9 further comprising means for housing said circular portion and rotor.

* * * * *